Nov. 4, 1969     R. E. DOREMUS ET AL     3,476,138
VALVE WITH STOP AND WASHOUT
Filed April 26, 1966     2 Sheets-Sheet 2
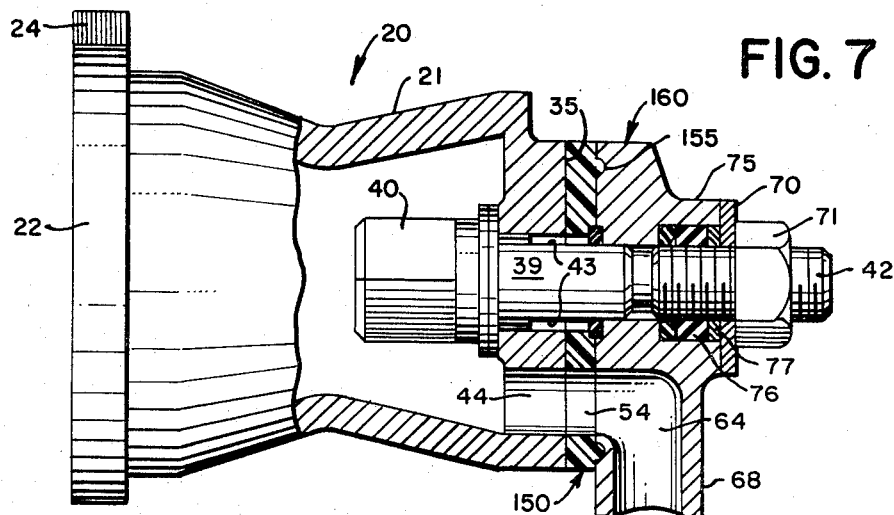
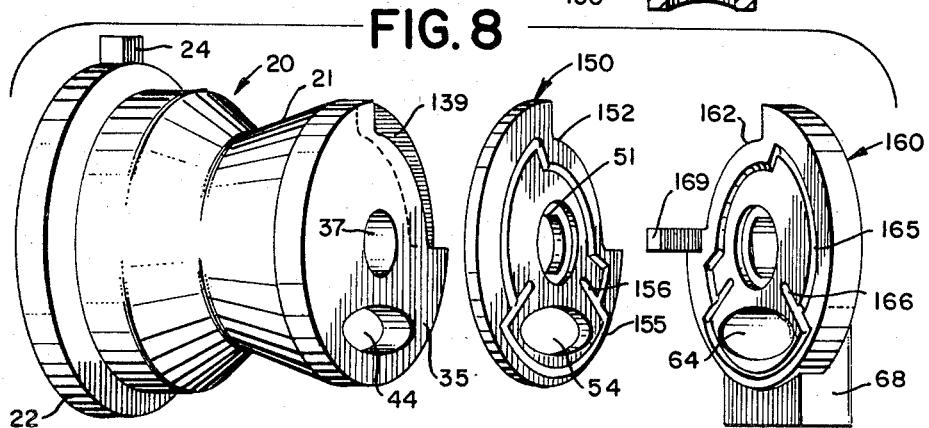
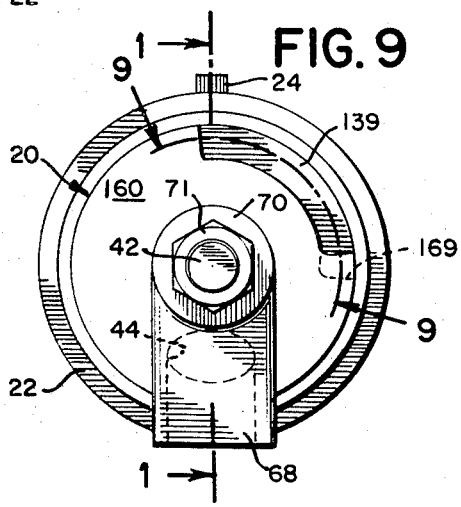
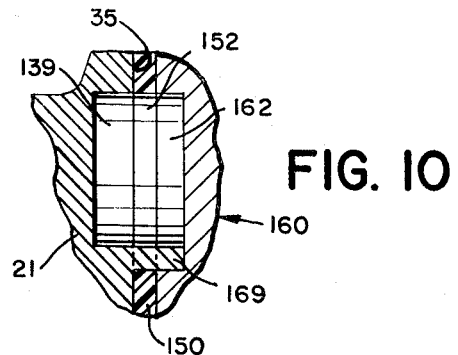
INVENTORS
R. ELLSWORTH DOREMUS
RICHARD E. DOREMUS
BY
ATTORNEYS

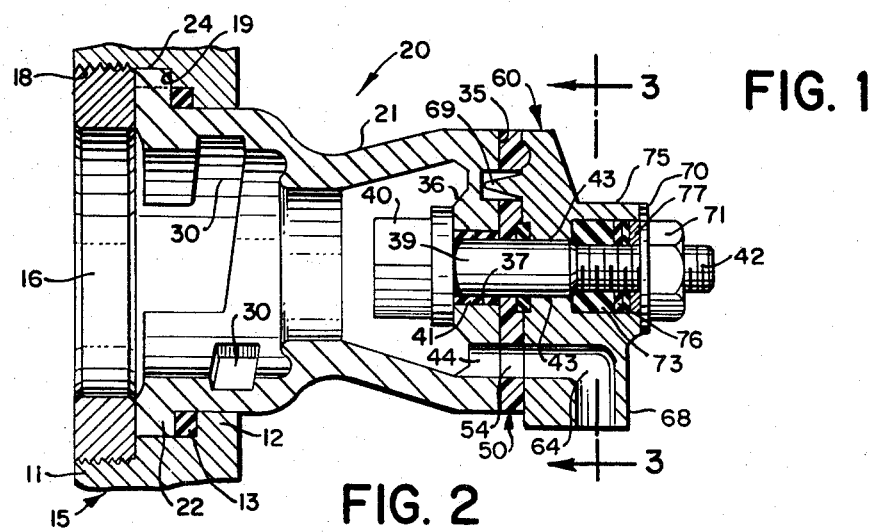

United States Patent Office 3,476,138
Patented Nov. 4, 1969

3,476,138
VALVE WITH STOP AND WASHOUT
R. Ellsworth Doremus, Clifton, and Richard E. Doremus, Upper Montclair, N.J., assignors to Golden Gate Manufacturing Company, Clifton, N.J., a corporation of New Jersey
Filed Apr. 26, 1966, Ser. No. 545,364
Int. Cl. F16k 43/00, 51/00; F16l 5/00
U.S. Cl. 137—323                                        11 Claims

ABSTRACT OF THE DISCLOSURE

A valve for dispensing liquid contents from a container in which the valve has an outlet port in its body and a rotatable valve member with a flow passage, the valve member being rotatable from a first to a second position by less than 180° to bring its flow passage into alignment with the body outlet port when in said first position and close off the outlet port when in said second position. Cooperating means are also provided on the valve member and the body to limit the rotation of the valve member, the cooperating means also ensuring that the valve member is properly oriented on the body so that the outlet port is opened and closed when the valve is rotated from the first to the second position. In one form of the invention the cooperating means comprise a mating groove and projection. In a preferred embodiment of the invention where an extension is provided on the valve member, the groove provides a washout passage for the extension when the valve is in the second (closed) position.

---

This invention relates to valves and more particularly to valves for use in a system for dispensing liquids from a keg or a barrel.

One widely adopted system for dispensing fluids, such as beer, from a keg is known as the Golden Gate system. This system utilizes a first fitting in a wall of the keg for connection to a source of pressurized gas and a normally closed liquid fill opening in the keg side wall. The keg also has a tapping valve preferably located in its side wall adjacent the keg bottom. The tapping valve accommodates a tapping device, such as a spigot, and rotating it in a first direction opens the valve to permit dispensing of the beer from the keg under pressure of the gas while locking the tapping device to the valve. Rotating the tapping device in a second direction closes the valve and disengages it from the valve.

In one form of valve currently used in the Golden Gate tapping system, the rotatable valve member, which is located inside of the keg adjacent the bottom wall, is provided with an extension member. With the valve open the extension member projects closer to the bottom of the keg wall than is possible with the normal open port or ports of a valve without such an extension. While such extension members are useful in withdrawing a somewhat greater quantity of liquid from the keg, they cause a problem in keg cleaning. Keg cleaning usually takes place with the tapping valve closed, so that the keg may be subsequently filled, and a caustic cleaning solution is employed. Unless special provisions are made, the extension member entraps and retains an amount of the cleaning solution. This renders the valve unsatisfactory since the caustic solution reacts deleteriously with the liquid in the keg and spoils its taste.

In valves with extension members it is also a problem to properly apprise the operator of the orientation of the valve member, that is, to let him know whether the valve is open or closed. This is particularly important since the extension member must be in the lowest position in the keg when the valve is open, or else its function is wasted.

The present invention is directed to an improved tapping valve with an extension member which solves the washout and orientation problems. In accordance with the invention, a washout slot is provided in a predetermined location in the valve body, so that the keg can be readily cleaned. A portion of the washout slot also serves as a guideway for a mechanical stop to insure proper orientation of the valve member at all times.

It is therefore an object of the present invention to provide an improved valve with an extension member having a washout slot and an arrangement for limiting rotation of the valve member.

A further object is to provide a valve having a stop mechanism formed by a post on its rotatable valve member which engages the walls of a slot of a predetermined shape in the valve body, the slot also serving to wash out an extension member located on the valve member.

An additional object is to provide a valve having a stop arrangement located within the active valve sealing area, a portion of this stop arrangement also serving as a washout slot for the valve.

Another object is to provide a valve with an extension member having a washout slot formed solely in the valve body.

Other objects and advantages of the present invention will become more apparent upon reference to the following specification and annexed drawings, in which:

FIGURE 1 is a side elevational, partial cross-section view of a valve in accordance with the present invention, also showing a portion of the keg to which the valve is attached; FIGURE 2 is an exploded perspective view of one embodiment of the valve of FIGURE 1; FIGURES 3 and 4 are top plan views, taken partially in section, showing the full open and closed positions of the valve and the washout action; FIGURES 5 and 6 are top plan views, also taken partially in section, showing the full open and closed positions of another embodiment of the valve; FIGURE 7 is a partial cross-sectional view of another embodiment of the valve made in accordance with the invention; FIGURE 8 is an exploded perspective view of the major components of the valve of FIG. 7; FIGURE 9 is a top plan view of the valve of FIG. 8; and FIGURE 10 is a cross-section of a portion of the valve taken along lines 9—9 of FIG. 9.

Referring first to FIGURES 1–4, the tapping valve 20 of the present invention has a hollow main body portion, or barrel, 21 formed with a ring flange 22 at one end thereof. The body 21 may be formed by any suitable process, such as investment casting. Flange 22 fits within a sleeve 11 and flange 12 on the barrel or keg 15 to which the valve is attached. A sealing washer 13 of any suitable material, such as rubber or a synthetic material for example is placed between valve flange 12 and valve flange 22. Valve 20 is held within the keg 15 by a locking ring 16 screwed into mating threads 18 on the sleeve 11 of the keg wall and engaging flange 22. Only a portion of the barrel 15 is shown in FIGURE 1, and the other details of the tapping system are omitted since they do not form a part of the invention.

Outwardly extending tab 24 on the valve flange 22 positions valve 20 in a groove 19 in the keg sleeve 11, so that a tapping device (not shown) may be readily inserted with its spigot pointing in a predetermined direction. The interior of the valve body 21 adjacent flange 22 has a pair of half threads 30 to accommodate the mating threads of the tapping device.

The end of the main body 21 opposite flange 22 terminates in an end wall 35 whose upper surface is substantially flat. A hole 37 in end wall 35 accommodates a rotatable spindle 39 whose threaded end 42 passes therethrough. The other end of spindle 39 has a polygonal, or otherwise keyed, head 40 adapted to mate with a corresponding portion of the tapping device which turns the spindle 39 as it is rotated into and out of threads 30. A washer 41 within a boss 36 on the valve body is placed over the spindle.

A port 44 is formed in the end wall 35 to communicate with the interior of the valve body 21. While port 44 is illustrated as being generally elliptical in shape, it can also have other suitable shapes. The contents of the keg are emptied through port 44 to the tapping spigot when the valve is open.

A pair of flats 43 are formed on the spindle 39 to key corresponding pairs of flats 51 and 61 on respective central holes 52 and 62 of a valve seat 50 and a valve member, or butt 60. Both the seat 50 and butt 60 are formed with corresponding ports 54 and 64 which are aligned when the seat and butt are mounted correctly on the spindle 39. The valve member 60, which can be made of the same or different metal material as the body, also has an outwardly projecting tubular extension 68. The extension is shown within the confines of the valve sleeve flange 22, but it can be made longer.

Seat 50 and butt 60 are held on the spindle 39 and the seat is brought into sealing engagement with the outer face of the end wall 35 by a washer 70 and a nut 71 screwed down on spindle threads 42 against an upper extension 75 of butt 60. A packing washer 73 is located within a recess on the butt upper extension 75 together with an O-ring 76 and a washer 77 to seal the screws threaded end of spindle 39. Nut 71 is tightened down on threads 42 to a degree sufficient to seal the valve while still permitting rotation of seat 50 and valve member 60 with respect to the valve end wall 35.

To hold the seat and butt together, the lower face of the butt 60 is formed with a depression or groove 65 which has the same general arcuate or circular contour as the outer edge of the butt. Curved groove 65 also has two end portions 66 which extend inwardly from its ends toward the center of the butt. A number of raised ribs or spokes 67 also are formed on the lower face of the butt and these extend radially in the area between the central hole 62 and the groove 65.

The seat 50 has a raised rib 55 of the same general shape as butt groove 65 and a number of small grooves or spokes 57 extending radially from a central hole 52 within the area between the hole and rib 55. Rib 55 also has two inwardly extending portions 56 corresponding to grooves 66 on the butt. The raised rib 55 and the grooves 57 of the seat 50 mate with the corresponding groove 65 and raised ribs 67 on the butt so that the two members are held together and rotated as a single unit as the spindle 39 is turned. An O-ring 73 is placed around the spindle between the mating faces of the seat and butt to provide a seal for the respective holes 52 and 62. Annular depressions are formed in the face of both the seat 50 and butt 60 to accommodate the thickness of the O-ring. It should be understood, of course, that the ribs and grooves on the butt and seat can be reversed to lock the two members together.

The face of seat 50 opposite the valve end wall 35 is made substantially flat and smooth so that a good bearing and seating surface is provided between the rotatable seat and the outer face of the end wall. Seat 50 is preferably made of "nylon" or Teflon molded with the desired grooves and/or ribs. The latter material is preferred for sanitary purposes since it does not deteriorate or break into pieces which can fall into the keg.

As seen most clearly in FIGURES 2–4, an arrangement is provided for limiting rotation of seat 50 and butt 60, a portion of which also provides a washout slot for the tubular extension member 68. This includes a main arcuate shaped slot or groove 29 formed in the end wall 35. Slot 29 starts approximately 90° counterclockwise from the center of the port 44 and extends counterclockwise around the end wall 35 for approximately 90° terminating at a point substantially diametrically opposite the center of the port. The end of slot 29 closest to port 44 communicates with a small radial slot 29a which extends outwardly through the edge of the sleeve 21. The other end of slot 29 communicates with a third slot 29b which is an arcuate extension of the principal slot 29 although slightly smaller in width and depth. All three slots 29, 29a and 29b are either cast as part of the end wall or milled therein. The action of these three slots in limiting rotation of valve member 50 and their washout function are described in greater detail below.

Butt 60 has a post 69 which extends downwardly from its lower face through a mating hole 59 in seat 50 to ride in the main slot 29. Post 69 can be cast as part of the butt 60, although it can be attached thereto by any suitable arrangement, and is preferably somewhat smaller than the main slot 29 to leave a passage for the cleaning solution. The travel of the post is limited by the end walls of slot 29 and the post is larger than the third slot 29b, so that it cannot move into it.

The main slot 29 preferably has an arc substantially equal to or slightly greater than that needed to rotate the valve member 50 to fully open and close port 44 in the end wall. In the preferred embodiment of the invention shown, this is approximately 90°. In operating the valve, rotation of the stem 39 by the tapping device is limited to the arc of the main slot 29 by the post 69 on the butt. At one limit of valve member rotation tapping device moves the aligned ports 54 and 64 of the seat and valve members to open port 44, so that the liquid in the keg passes through extension 68 to the interior of the valve body and out through the tapping device. At the other limit the valve member closes port 44. The former condition is shown in FIGURE 3, while the latter is shown in FIG. 4.

The auxiliary slot 29b has an arc of slightly less than 90° so that it can communicate with the openings 54 and 64 of the seat and valve member when the valve is closed. As can be seen in FIG. 4, at this time there is communication between the passage in extension member 68, auxiliary slot 29b, main slot 29 and washout slot 29a. Thus, when the keg is washed out with the cleaning solution and then blown out with compressed air applied through another keg opening (not shown) any fluid retained in the extension member 68 is forced out through the washout passage provided by the slots. At the time the valve 20 is fully open (FIG. 3) there is no communication between the fluid in the keg and the two slots 29a or 29b.

While the washout slot arrangement of FIGS. 1–4 is fully operative, it require that the auxiliary slot 29b be formed in the valve and wall to communicate with the extension member 68. FIGS. 5 and 6 show another embodiment of the invention which eliminates the need for this auxiliary slot. In this embodiment all of the other portions of the valve are the same with the exception of the slot configuration and the locations of the slot and post.

As seen in FIGS. 5 and 6, a main slot 79 begins approximately 90° clockwise from the center line of port 44, as distinguished from 90° counterclockwise slot location in the embodiments of FIGURES 1–4. The slot 79 extends arcuately around the face of the valve approximately for about 90° and terminates in a washout slot 79a which extends through the edge of the valve sleeve. The post 69 on the butt 60 and the opening 59 on the seat 60 are moved approximately 90° counterclockwise from their locations shown in FIGS. 1–4 and, as before, the size of the post 69 with respect to the slot is such to permit the cleaning solution to flow through the slot 79. The same type of fastening arrangement shown in FIGS. 1-4 for the sealing member 50 to the butt 60 is preferably used.

In operation of the valve of FIGS. 5 and 6, with the valve open the sealing member and butt openings 54 and 64 are aligned with the port 44, so that fluid in the keg flows through the tubular extension member 68 and out of the valve. Rotation of the valve member 50 when the valve is opened is limited by the post 69 which abuts the end wall of slot 79 nearest the port 44. When the valve member is rotated to the closed position (FIG. 6) post 69 abuts the end wall of slot 79 opposite the centerline of port 44. Here, port 44 is completely closed by the seat and valve member but there is communication between the tubular extension member 65, slot 79 and the washout slot 79a. This again permits the tubular extension member to be washed out.

FIGS. 7-10 show another, and the preferred embodiment of valve which simplifies manufacturing by forming the washout and limit slot on the edge of the sleeve and the post on the edge of the butt.

The same reference numerals are used where applicable as in the previous figures. Here the end wall 35 of the valve is formed with a slot 139 on its outer edge. Slot 139 starts approximately 90° counterclockwise from the center of the port 44 and extends for about an additional 90°.

Both the seat 150 and the butt 160 also have portions 152 and 162 removed from their outer edges. These portions are about the same size as slot 139. A post 169 is formed on the butt 160 at or near one end of its removed portion 162.

When the seat 150 and butt 160 are assembled to the valve by the spindle 39, the post 169 extends into the slot 139. With the valve open, as shown in FIGURE 9, the post 169 abuts the end wall of slot 139 closest to port 44. When the butt 160 is rotated counterclockwise for about 90° until post 169 hits the other end wall of the slot, port 44 is closed off. However, at this time there is communication between the tubular extension 68, seat and butt ports 54 and 64 and the slot 139, so that the keg can be washed out.

The embodiment of valve shown in FIGURES 7-10 also has an improved arrangement for locking the seat 150 and butt 160 together. Here, the raised rib 155 on the seat and the corresponding depressed groove 165 on the butt is continuous and extends around the corresponding outer portions of the ports 54 and 64. The mating rib and groove each follows the same path as the periphery of its member and is spaced inwardly by an amount from their edges. Two radially inwardly extending rib and groove portions 156 and 166 lock the seat and butt together. This arrangement provides a good lock and also seals off the end wall opening for the spindle as well as the portion of the end wall outside of the port 44, so that there is no side leakage between the seat and butt.

The embodiment of the valve shown in FIGS. 7-10 has a manufacturing advantage in that it is relatively easy to form the slot 139 on the edge of the valve sleeve. The same holds true for forming the post 166 on the outer edge of the butt. It should also be understood that the portions 152 and 162 need not be removed from the seat and butt.

In each of the three embodiments of the valve described a novel slot arrangement has been provided which is used for both limiting the rotation of the butt and providing a washout slot for an extension member. The former is highly desirable since it positively indicates full opening and closing of port 44. Also the slot and post arrangements prevent the butt and seat members from being incorrectly assembled. The washout slot function is also advantageous since it does not require any additional holes or passages in either the extension or the butt.

What is claimed is:

1. A valve for dispensing liquid contents from a container comprising:
   a body member adapted to be placed within a tapping hole of the container, said body member having an opening at one end thereof adapted to accept an actuating device from outside the container and an end wall with an outlet port therein into the valve body at the other end and adapted to be located within the container,
   a rotatable spindle having one end thereof extending through said end wall, the other end of said spindle located within the body member for engagement with the actuating device which is adapted to rotate the spindle substantially less than 180° from a first to a second position,
   a valve member on said one end of said spindle and rotatable therewith, an extension on said valve member and a passage through said extension and said valve member, rotation of said spindle and the valve member to said first position bringing the passage into alignment with said outlet port and rotation to said second position closing off said outlet port,
   and means on the opposing faces of the end wall and valve member for limiting the rotation of said valve member between said first and second positions and permitting the valve member to be located on said body member end wall only with the proper orientation, said means also providing communication between the passage in said extension and the exterior of the body member when the valve member is in said second position.

2. A valve as in claim 1 wherein said means for limiting the rotation of the valve member comprises a slot on one of said valve body end wall and valve members and a post extending from the other of the members into the slot, said slot communicating with the passage of the extension member when the valve member is in said second position and extending to the edge of its corresponding member to provide the communication between the extension passage and the exterior of the valve body.

3. A valve as in claim 2 wherein said slot is formed in the end wall of the valve body and said post is formed on said valve member.

4. A valve as in claim 3 wherein the slot has a first portion in which the post travels and a second portion providing communication between the first portion and the exterior of the valve body.

5. A valve as in claim 3 wherein the slot has a first portion in which the post travels to limit the rotation of the valve member, a second portion providing communication between the first portion and the exterior of the valve body and a third portion providing communication between the extension passage and the first portion.

6. A valve as in claim 3 wherein said slot is located on the outer edge of the valve body and the post is formed on the valve member to ride in said slot.

7. A valve as in claim 6 wherein said valve member is formed with a portion removed from the edge thereof corresponding to the slot on the edge of the valve body.

8. A valve member as in claim 6 further comprising a seat member between said valve member and said valve body end wall, and mating extending and recessed means on said seat and valve member for locking the two together.

9. A valve as in claim 8 wherein said valve member and said seat are each formed with a portion removed from the edge thereof corresponding to the slot on the edge of the valve body.

10. A valve as in claim 3 further comprising a seat member between said valve member and said valve body end wall, and mating extending and recessed means on said seat and valve member for locking the two together.

11. A valve member as in claim 9 wherein said mating locking means form a sealed area and said post extends through said seat member within said sealed area.

References Cited

UNITED STATES PATENTS

| | | | |
|---|---|---|---|
| 1,315,741 | 9/1919 | Pranold | 251—287 |
| 2,992,654 | 7/1961 | Doremus et al | 137—323 |
| 3,302,660 | 2/1967 | Haag | 137—323 X |

WILLIAM F. O'DEA, Primary Examiner

DAVID R. MATTHEWS, Assistant Examiner